Figure 1:
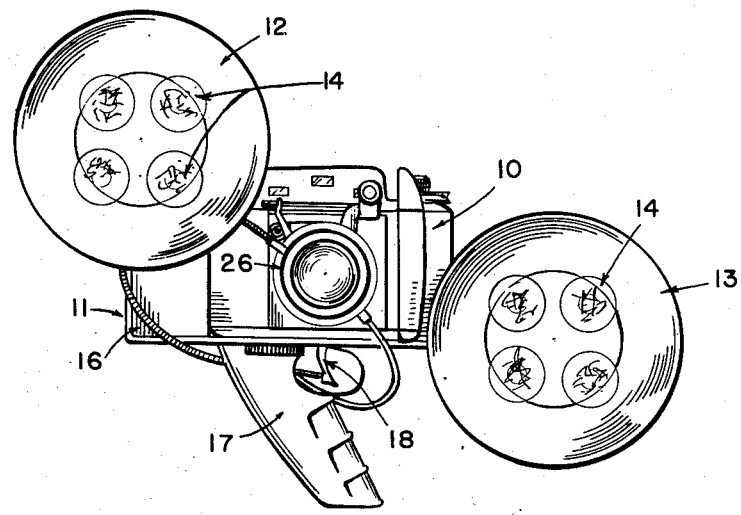

March 9, 1954  T. C. KNIGHT  2,671,387
CAMERA APPARATUS, INCLUDING FILM WINDING, SHUTTER
SETTING, AND FLASH LAMP SWITCHING MECHANISM
Filed Dec. 8, 1950  3 Sheets-Sheet 1

Thomas C. Knight INVENTOR.

BY Arthur A. Smith

March 9, 1954   T. C. KNIGHT   2,671,387
CAMERA APPARATUS, INCLUDING FILM WINDING, SHUTTER
SETTING, AND FLASH LAMP SWITCHING MECHANISM
Filed Dec. 8, 1950   3 Sheets-Sheet 2

Thomas C. Knight INVENTOR.

BY Arthur A. Smith

March 9, 1954

T. C. KNIGHT 2,671,387

CAMERA APPARATUS, INCLUDING FILM WINDING, SHUTTER
SETTING, AND FLASH LAMP SWITCHING MECHANISM

Filed Dec. 8, 1950

3 Sheets-Sheet 3

Thomas C. Knight INVENTOR.

BY Arthur A. Smith

Patented Mar. 9, 1954

2,671,387

UNITED STATES PATENT OFFICE 2,671,387

CAMERA APPARATUS, INCLUDING FILM WINDING, SHUTTER SETTING, AND FLASH LAMP SWITCHING MECHANISM

Thomas C. Knight, Grosse Point Woods, Mich.

Application December 8, 1950, Serial No. 199,826

12 Claims. (Cl. 95—11.5)

This invention relates generally to photographic cameras and more particularly it relates to apparatus for controlling photographic cameras in such a manner that a plurality of film frames may be exposed in quick succession.

Conventional camera apparatus of certain types includes film winding apparatus, shutter-cocking mechanism, shutter release mechanism, and flash-lighting equipment. Some of these components of camera equipment have been connected and inter-related in such a manner that they cooperate with one another to a certain degree. For example, the shutter release mechanism has been connected to the flash-lighting equipment whereby a flash bulb may be energized simultaneously with operation of the shutter. In other examples, the film winding apparatus has been connected to a shutter-cocking mechanism for winding a single frame of film and releasing the shutter to expose a succeeding frame of film. However, no provisions are made in the prior art for correlating the operation of flash-lighting equipment with film winding apparatus and a shutter-cocking mechanism whereby it is not possible with conventional apparatus to expose a plurality of frames of films in quick succession and operate a flash-light during each successive film exposure. The character of conventional flash-lighting equipment compels the photographer to perform such operations between each exposure of the film such, for example, as ejecting a used flash bulb and replacing it with a new flash bulb. This is time consuming and often prevents the photographing of events which occur in quick succession.

Accordingly, the principal object of this invention is to provide novel camera apparatus for winding a film, cocking a camera shutter, and connecting a flash bulb in circuit with a source of electrical energy in rapid succession, whereby a plurality of film frames may be exposed in rapid succession.

Another object of this invention is to provide a novel camera apparatus for winding film and cocking a camera shutter and conditioning a multiple-flash light equipment for successively connecting one flash bulb after another as one frame of film after another is exposed.

Still another object of this invention is to provide novel camera apparatus for winding one frame of film after another and simultaneously cocking a camera shutter after each frame of film is wound.

Still another object of this invention is to provide a novel camera apparatus wherein one frame of film after another may be wound and the shutter may be cocked simultaneously therewith and the shutter may be reset for cocking automatically after exposure of a frame of film.

In accordance with this invention there is provided, in combination, a film winding apparatus, a shutter-cocking mechanism, a means connected to said film winding apparatus for cocking the shutter as a frame of film is wound, a multiple flash bulb apparatus, and a means connected between said film winding apparatus and said multiple flash bulb apparatus for connecting one flash bulb after another in circuit with a battery as each frame of film is wound.

In accordance with another feature of this invention, there is provided in a camera, a film winding apparatus for winding one frame of film at a time, a flash bulb system including a battery, a plurality of bulbs, and a step by step switch for connecting one bulb after another to the battery together with means operated by the film winding mechanism for actuating the switch as the film is wound.

In accordance with a further feature of this invention, there is provided a novel film winding apparatus for cameras including a means for cocking a shutter as a frame of film is wound and resetting the cocking mechanism for recocking after each frame is exposed.

For a better understanding of the invention, together with other and further objects thereof, reference is made to the following description, taken in connection with the accompanying drawings, and its scope will be pointed out in the appended claims.

In the accompanying drawings:

Figure 1 of the drawings is a front view of a camera and multiple flash bulb apparatus.

Figure 2:
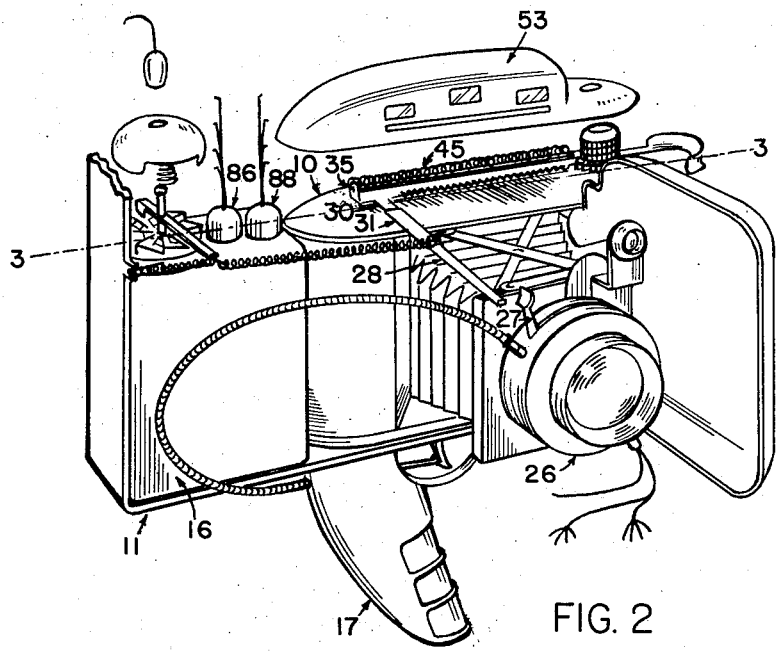

Figure 2 of the drawings is a front perspective view on an enlarged scale of the camera shown in Figure 1 with certain parts omitted or in exploded relation to the main body of the camera.

Figure 3:
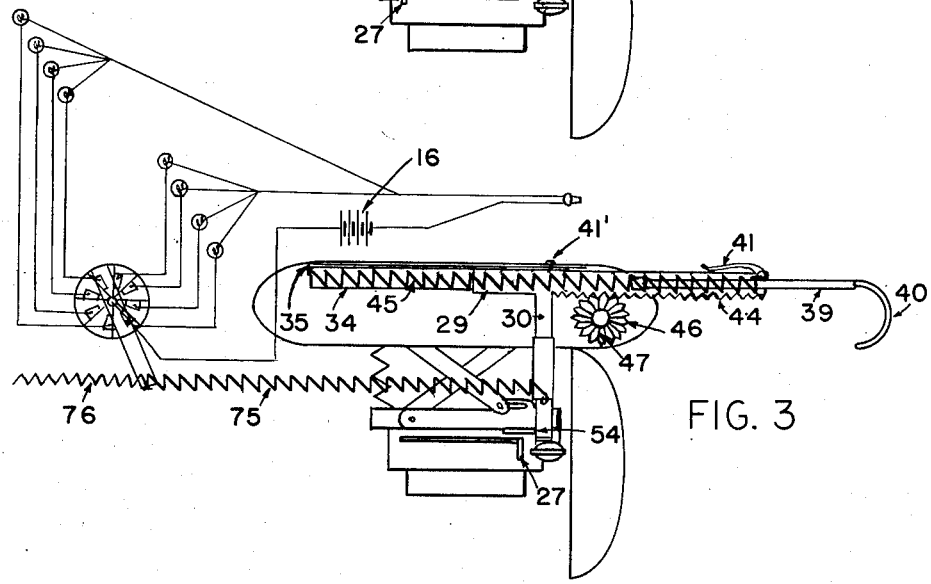

Figure 3 of the drawings is a top view, taken on line 3—3 of Figure 2, illustrating the film winding apparatus in position to wind film and cock the shutter and also showing a circuit diagram of the electrical connections of the flash bulbs.

Figure 4:
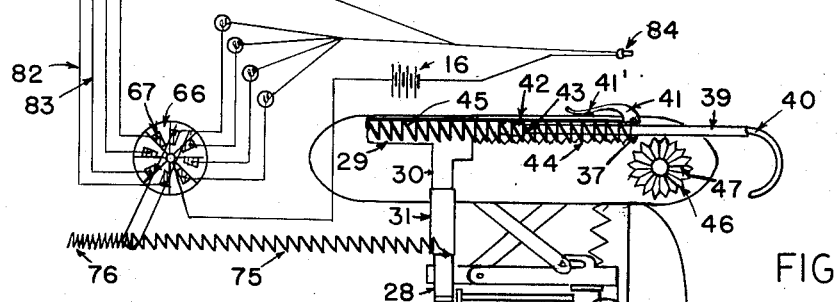

Figure 4 of the drawings is a top view taken on line 3—3 of Figure 2 except that the film winding apparatus is illustrated in the position which it assumes after a frame of film has been wound and the shutter has been cocked.

Figure 5:
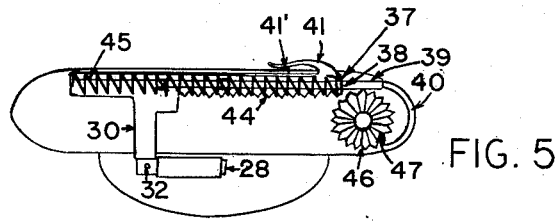

Figure 5 of the drawings is a top view taken on line 3—3 of Figure 2 except that the camera is illustrated in its folded position.

Figure 6:
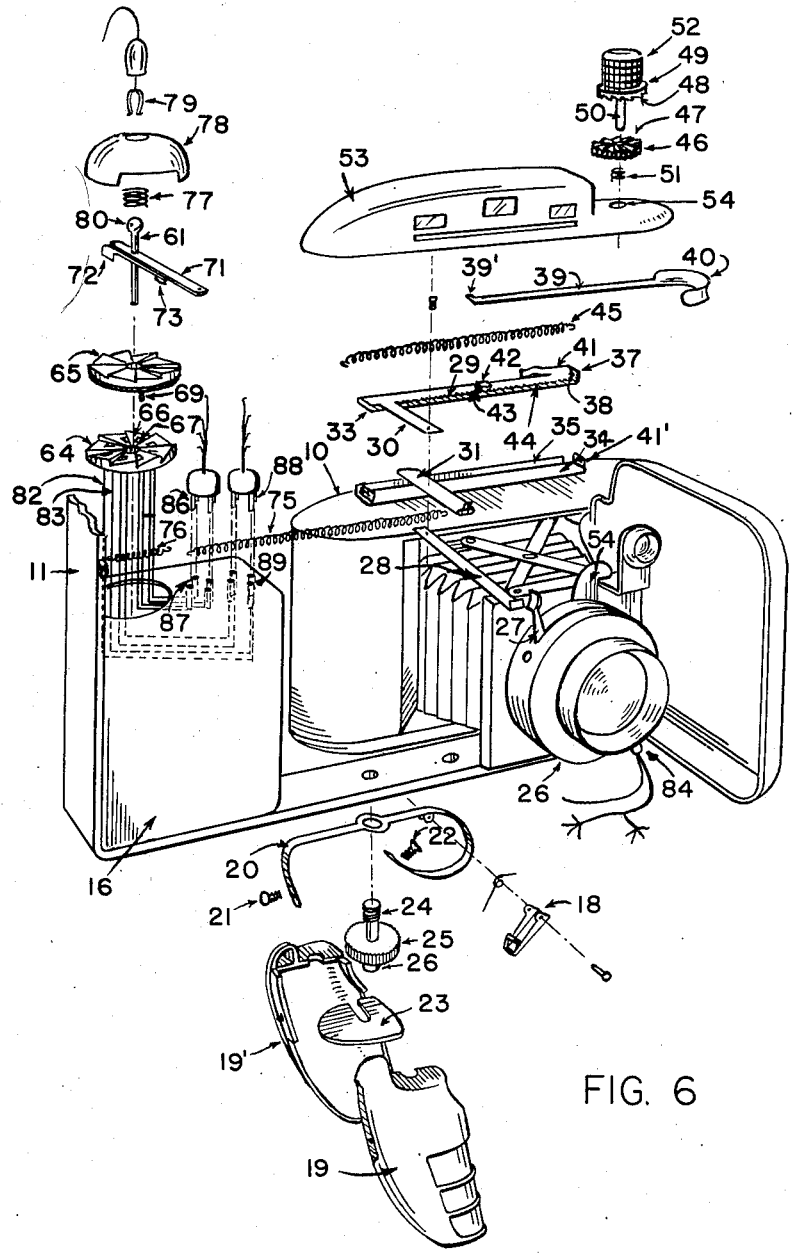

Figure 6 of the drawings is a front perspective view of a camera showing the film winding apparatus, the shutter-cocking apparatus, the shutter releasing apparatus, and the flash bulb switching apparatus in exploded relation to the main body of the camera.

In accordance with this invention, there is provided a photographic camera 10 of the conventional expanding bellows type. This type of camera is shown for purposes of illustration only and it is to be understood that this invention is applicable to cameras of many different types. Fixed to the casing of the camera is a frame 11 which is substantially L-shaped as shown. Mounted on the frame 11 in any suitable fashion is a first reflector 12 at the end of one leg of the frame and a second reflector 13 at the end of the other leg of the frame. Within the reflectors may be mounted a plurality of flash bulbs 14 which may be electrically operated in accordance with known techniques. Frame 11 projects beyond one end of the camera 10, leaving a space within which may be mounted a battery 16 for energizing the flash bulbs 14. On the lower side of frame 11 there is provided a handle 17 which may be similar in form to a pistol grip. Handle 17 may be split in two halves 19 and 19' as illustrated in Figure 6 of the drawings. The handles may be secured together by means of a clip 20 which may be secured by the screws 21 and 22. For preventing the cracking of the handle, when formed of a plastic material, there is provided a metal plate 23 through a slot in which may project a bolt 24 having a knurled member 25 and a slightly enlarged head 26. Head 26 may be fitted below the slot in plate 23 and the handle may then be fastened to camera 10 by screwing bolt 24 into the threaded aperture customarily provided in cameras for mounting them on a tripod.

Camera 10 includes a conventional lens and shutter assembly 26 out of which projects a part of the shutter-cocking mechanism comprising lever 27. For operating the shutter-cocking lever, there is provided a mechanism which is also adapted to wind film, one frame at a time. This mechanism includes an arm 28, and an L-shaped gear rack member 29 having an arm 30 to which the arm 28 is pivoted as at 32. This forms an extensible and collapsible arm. Figures 4 and 5 show the sleeve 31 which may be moved entirely on to the lever 28 whereby the lever 28 may be folded at right angles to arm 30 which is the position of this mechanism when the camera is folded to its closed position. When the camera is opened, arm 28 may be rotated into alignment with arm 30, and sleeve 31 may be slipped into engagement with arm 30 thereby forming a substantially rigid connection between rack 29 and lever 28.

The gear rack 29 is formed to have an underlying lip 33 which is adapted to fit over a lip 34 of a base member 35 having the form of a channel. Base 35 may be secured to the casing of camera 10 by screws or rivets or other suitable means. Rack 29 also includes an ear 37 at one end thereof having an aperture 38 which is adapted to receive the shank 39 of a handle 40. The inner end of shank 39 is formed into a hook 39 and engages a guide 42 mounted on the rack 29, and this guide may be provided with an aperture 43 through which shank 39 may extend and slide. For holding the gear rack 29 in its normally inoperative position as shown in Figure 5, there is provided a spring 45, one end of which may be secured to the ear 37 and the other end of which may be secured to the end of the channel 35 as illustrated in Figure 2. Gear 29 is also provided with a spring clip 41 which is aligned with and adapted to push inwardly a film release button 41'.

The rack 29 is provided with teeth 44 which are provided for the purpose of driving a gear 46, the number of teeth 44 being selected to provide the winding of a full frame of film during one stroke of rack 29. Gear 46 is connected to the film winding mechanism of the camera by means of a ratchet mechanism comprising the serrated teeth 47 on its upper surface which are adapted to engage serrated teeth 48 on the under side of a disc 49. Disc 49 may be fixed to a shaft 50 which extends into engagement with the film winding mechanism of the camera. The gear 46 fits freely over shaft 50 and is urged into engagement with disc 49 by means of a spring 51, which engages the casing of the camera and gear 46, whereby its serrated surface 47 is urged into engagement with the serrated surface 48 of disc 49. For manually rotating the film winding mechanism, there is provided a knob 52.

For covering the film winding and shutter cocking mechanism, there is provided a cover 53 which may be secured to the camera casing in any suitable fashion. Cover 53 includes an aperture 54a for receiving the shaft 50 whereby it is permitted to extend into engagement with the film winding mechanism.

In operation it will be assumed that the camera has been opened and the parts are in the positions shown in Figure 4 of the drawings except that the handle 40 is in the position shown in Figure 5. Handle 40 may be moved to an operative position shown in Figure 4 where the hook portion 39' of shank 39 engages the guide 42. By pulling further on the handle 40, spring 41 presses button 41' to release the film winding mechanism and the gear teeth 44 engage the teeth of gear 46, thereby to rotate gear 46 and therewith the gear 49. In turn, gear 49 rotates shaft 50 and the film winding mechanism to wind a frame of film onto the film spool. Simultaneously with the winding operation, the lever 28 will have engaged the shutter-cocking lever 27 and moved it in a clockwise direction to the full cocked position. However, since the gear rack 29 will move beyond the full cocked position of the cocking lever 27, arm 28 will move upwardly over the cocking lever 27, this upward movement being controlled by a cam 54 which is positioned properly to lift arm 28 as soon as cocking lever 27 is in its full cocked position. The travel of gear rack 29 is terminated by the operation of film release button 41' to stop the winding of film when a single frame has been wound, in accordance with conventional practice.

For igniting a flash bulb at the same time that the camera shutter is released for exposing a film frame, there is provided a switching mechanism which is connected between the flash bulbs 14 and a battery 16. The switching mechanism comprises a step by step switch consisting of a shaft 61 which may be rotatably mounted on the battery 16 and electrically connected to one of its terminals, for example, the positive terminal. A ratchet arrangement comprising two discs 64 and 65 are mounted on shaft 61, disc 64 being free of shaft 61 and fixed to battery 16 so that it will not rotate. Disc 64 has a serrated upper surface consisting of a plurality of triangular inclined planes, such as 66, and in each of the inclined planes, there is provided an electrically conductive element 67. Cooperating with the upper surface of disc 64 is a pin or pawl 69 which extends downwardly from the lower surface of disc 65 in radial alignment with the conductive elements 67, whereby disc 65 may be rotated step by step, moving pin 69 from one conductive element 67 to another. For rotating disc 65 with respect to disc 64, there is provided a crank arm or pawl 71 fixed relative to shaft 61 and including downwardly projecting ears 72 and 73. These ears are adapted to engage the teeth formed by the serrated surface of disc 65. Disc 65 is free to rotate with respect to shaft 61. Arm 71 is connected to and operated by a spring 75 which is fixed between the end of arm 71 and the sleeve 31 of the shutter-cocking mechanism. The arm 71 is also connected by lighter spring 76 to a portion of the L-shaped frame 11. When the shutter-cocking mechanism is operated, tension occurs in spring 75 and overcomes the tension in spring 76, thereby rotating arm 71. When the shutter-cocking mechanism is returned to its normal position, the tension in spring 76 moves arm 71 back to its normal position and into engagement with another set of teeth on disc 65, whereby arm 71 may be oscillated to step disc 65 through a complete revolution in successive steps. For biasing the arm 71 in a downward direction, there is provided a spring 77 which is adapted to slip over the shaft 61 into engagement with arm 71 and may be held in its compressed position by means of a cover 78 which may be fixed to shaft 61 in any suitable manner, such as by threading. For connecting shaft 61 to the positive pole of battery 16, there is provided a jack 79 which has spring clips adapted to slip over a head 80 on shaft 61.

For connecting the flash bulbs to the conductive elements 67 of disc 64, there is provided a series of conductors, such as 82 and 83. Thus each conductive element 67 may be connected to a different flash bulb. The flash bulbs are connected in multiple as shown in Figures 4 and 5 to a plug 84 which is adapted to be connected to a conventional switch operated by the shutter mechanism, the plug 84 being inserted in a conventional receptacle in the shutter and lens assembly. For conveniently connecting the flash bulbs 14 which are associated with reflectors 12 and 13, there may be provided plug and jack arrangements, such as 86, 87, 88 and 89, the jacks 87 and 89 being mounted on the upper portion of battery 16.

As already described, the film winding and shutter-cocking mechanism may be operated successively to cock the shutter and wind film; and trigger 18 of the pistol grip arrangement 17 may be operated to release the shutter and expose each frame of film. Simultaneously with the operation of trigger 18, the flash bulb which happens to be connected to the battery 16 is fired. Thus by operating the handle 40, successive frames of film are wound, the shutter-cocking lever 27 is operated, and the stepping switch, comprising discs 64 and 65, successively connects one flash bulb after another. Accordingly, a series of eight or more frames of film may be exposed in quick succession, the only limitation being the speed with which the photographer operates handle 40 and trigger 18. The number of frames which may be exposed may be increased by increasing the number of flash bulbs.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A camera apparatus comprising a frame, a film winding mechanism for winding one frame of film at a time, a shutter-cocking mechanism, a shutter-cocking arm connected to said winding mechanism and extending into operative relationship with said shutter-cocking mechanism for cocking the camera shutter during the winding of a film frame, a flash bulb system mounted on said frame and including a battery, a plurality of bulbs, a step by step switch having an operating arm and being connected to each bulb and to said battery, and a yieldable operating connection interconnecting said operating arm and said shutter-cocking arm for operating said switch step by step from one contact to another as said film is wound.

2. A camera apparatus comprising a frame, a film winding mechanism for winding one frame of film at a time, a shutter-cocking mechanism, a shutter-cocking arm connected to said winding mechanism and extending into operative relationship with said shutter-cocking mechanism for cocking the camera shutter during the winding of a film frame, a flash bulb system mounted on said frame and including a battery, a plurality of bulbs, and a step by step switch comprising a plurality of stationary contacts, a connection from each contact to a bulb, a movable contact connected to said battery and mounted for movement into engagement with each of said stationary contacts, an operating arm on said switch for moving said movable contact to succeeding positions, and yieldable means connected to said movable contact and said shutter-cocking arm for moving said movable contact step by step from stationary contact to another as said winding mechanism is operated.

3. A camera apparatus comprising a frame, a film winding mechanism for winding one frame of film at a time, a shutter-cocking mechanism, a shutter-cocking arm connected to said winding mechanism and extending into operative relationship with said shutter-cocking mechanism for cocking the camera shutter during the winding of a film frame, a flash bulb system mounted on said frame and including a battery, a plurality of bulbs, and a step by step switch comprising a plurality of stationary contacts, a connection from each contact to a bulb, a movable contact connected to said battery and mounted for movement into engagement with each of said stationary contacts and a ratchet and pawl mechanism connected to said movable contact for moving it step by step from one contact to another, a link connected between said shutter-cocking arm and said ratchet and pawl mechanism for moving said movable contact step by step from one stationary contact to another, and a spring connected between said frame and said ratchet and pawl mechanism for resetting said ratchet and pawl mechanism after each step of said movable contact.

4. A camera apparatus comprising a frame, a film winding mechanism, a rack and pinion connected between said frame and said mechanism for winding one frame of film at a time, a shutter-cocking mechanism, a shutter-cocking arm connected to said rack and extending into operative relationship with said shutter-cocking mechanism for cocking the camera shutter during the winding of a film frame, a flash bulb system mounted on said frame and including a battery, a plurality of bulbs, and a step by step switch comprising a ratchet wheel having a contact on the face of each tooth thereof, connections from each contact to a bulb, a switching pawl contact connected to said battery and rotatably mounted for movement through an angle of 360 degrees into engagement with each of said contacts and a second ratchet and pawl contact mechanism connected to said switching pawl for moving it step by step from one contact to another, a relatively strong spring connected between said shutter-cocking arm and said second ratchet and pawl mechanism for moving said switching pawl step by step from one contact to another, and a lighter spring connected between said frame and said second ratchet and pawl mechanism for resetting said second ratchet and pawl mechanism after each step of said switching pawl.

5. A camera apparatus comprising a frame, a film winding mechanism, a spring biased rack and pinion connected between said frame and said mechanism for winding one frame of film at a time, a shutter-cocking mechanism, a collapsible shutter-cocking arm connected to said rack and extending into operative relationship with said shutter-cocking mechanism for cocking said shutter during the winding of a film frame, a flash bulb system mounted on said frame and including a battery, a plurality of bulbs, and a step by step switch comprising a ratchet wheel having a contact on the face of each tooth thereof, connections from each contact to a bulb, a switching pawl connected to said battery and rotatably mounted for movement into engagement with each of said contacts and a second ratchet and pawl mechanism connected to said switching pawl for moving it step by step from one contact to another, and series connected springs including a relatively strong spring connected between said shutter-cocking arm and said second ratchet and pawl mechanism for moving said switching pawl step by step from one contact to another and a lighter spring connected between said frame and said second ratchet and pawl mechanism for resetting said second ratchet and pawl mechanism after each step of said switching pawl.

6. A camera apparatus comprising a frame, a film winding mechanism for winding one frame of film at a time, a flash bulb system mounted on said frame and including a battery, a plurality of bulbs, and a step by step switch comprising a plurality of stationary contacts, a connection from each contact to a bulb, a movable contact connected to said battery and mounted for movement into engagement with each of said stationary contacts and a ratchet and pawl mechanism connected to said movable contact for moving it step by step from one contact to another, a link connected between said film winding mechanism and said ratchet and pawl mechanism for moving said movable contact step by step from one stationary contact to another, and a spring connected between said frame and said ratchet and pawl mechanism for resetting said ratchet and pawl mechanism after each step of said movable contact.

7. A camera apparatus comprising a frame, a film winding mechanism, a shutter-cocking mechanism mounted on said frame and including a member movable from an uncocked position to a cocked position, an arm connected to said mechanism and extending into operative relationship with said shutter-cocking member for cocking said shutter during the winding of a film frame, said arm being first movable to operate said shutter-cocking member to cocked position, then secondly returnable to its starting position without disturbing the position of said shutter-cocking member and means mounted adjacent the cocked position of said member and in the path of movement of said arm whereby said arm may be released from engagement with said lever when said member reaches the cocked position.

8. A camera apparatus comprising a frame, a film winding mechanism, a rack and pinion connected between said frame and said mechanism for winding one frame of film at a time, a shutter-cocking mechanism mounted on said frame and including a member movable from an uncocked position to a cocked position, an arm connected to said rack and extending into operative relationship with said shutter-cocking member for cocking said shutter during the winding of a film frame, said arm being first movable to operate said shutter-cocking member to cocked position, then secondly returnable to its starting postion without disturbing the position of said shutter-cocking member and means mounted adjacent the cocked position of said member and in the path of movement of said arm whereby said arm may be released from engagement with said member when said member reaches the cocked position.

9. A camera apparatus comprising a frame, a film winding mechanism, a spring biased rack and pinion connected between said frame and said mechanism for winding one frame of film at a time, a shutter-cocking mechanism mounted on said frame and including a lever movable from an uncocked position to a cocked position, a telescoping arm connected to said rack and extending into operative relationship with said shutter-cocking lever for cocking said shutter during the winding of a film frame, and a cam mounted adjacent the cocked position of said lever and in the path of movement of said arm whereby said arm may be cammed out of engagement with said lever when said lever reaches the cocked position.

10. A camera apparatus comprising a frame, a film winding mechanism for winding one frame of film at a time, a shutter-cocking mechanism operatively connected to said winding mechanism for operating the camera shutter during winding of a film frame, a flash bulb system mounted on said frame, a plurality of bulbs, a step by step switch having an operating arm and being connected to each bulb, and a yieldable operating connection interconnecting said operating arm and said shutter-cocking mechanism for operating said switch step by step from one contact to another as said film is wound.

11. A camera apparatus comprising a frame, a film winding mechanism for winding one frame of film at a time, a shutter-cocking mechanism operatively connected to said winding mechanism for operating the camera shutter during winding of a film frame, a flash bulb system mounted on said frame, a plurality of receptacles and a step by step switch comprising a plurality of stationary contacts, a connection from each contact to a bulb receptacle, a movable contact mounted for movement into engagement with each of said stationary contacts, an operating arm on said switch for moving said movable contact to succeeding positions, and yieldable means connected to said movable contact and said shutter-cocking mechanism for moving said movable contact step by step from one stationary contact to another as said winding mechanism is operated.

12. A camera apparatus comprising a frame, a film winding mechanism for winding one frame of film at a time, a flash bulb system mounted on said frame, a plurality of bulb receptacles, and a step by step switch comprising a plurality of stationary contacts, a connection from each contact to a bulb receptacle, a movable contact mounted for movement into engagement with each of said stationary contacts, and first means connected to said movable contact for moving it step by step from one contact to another, a link connected between said film winding mechanism and said means for moving said movable contact step by step from one stationary contact to another, and a second means connected between said frame and said first means for resetting said first means after each step of said movable contact.

THOMAS C. KNIGHT.

References Cited in the file of this patent

UNITED STATES PATENTS

| Number | Name | Date |
|---|---|---|
| 1,699,906 | Murray | Jan. 22, 1929 |
| 2,191,402 | Saffir et al. | Feb. 20, 1940 |

FOREIGN PATENTS

| Number | Country | Date |
|---|---|---|
| 381,481 | Germany | Sept. 21, 1923 |
| 609,000 | Germany | Feb. 6, 1935 |